B. BISS & L. KOHN.
RESILIENT WHEEL.
APPLICATION FILED APR. 23, 1917.
1,245,150.
Patented Nov. 6, 1917.
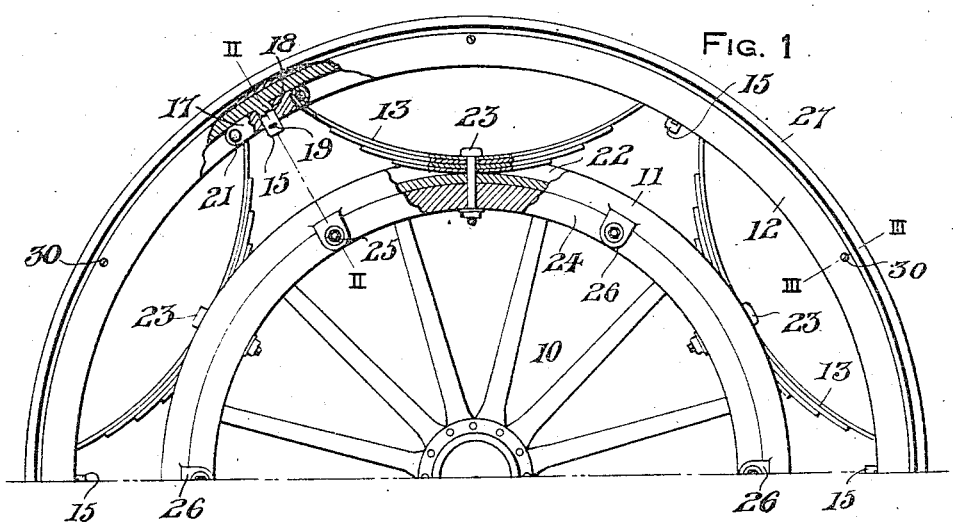
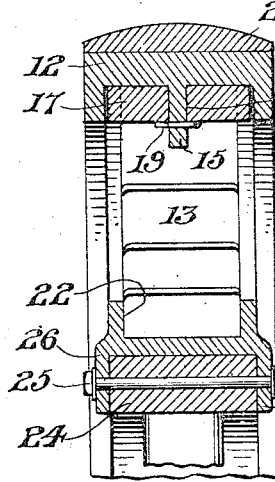
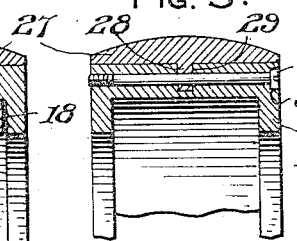
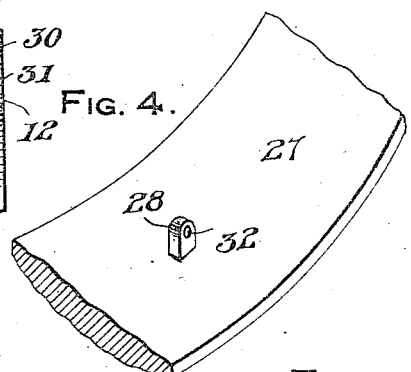
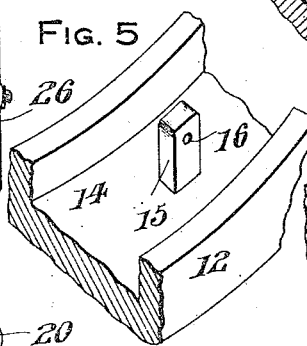
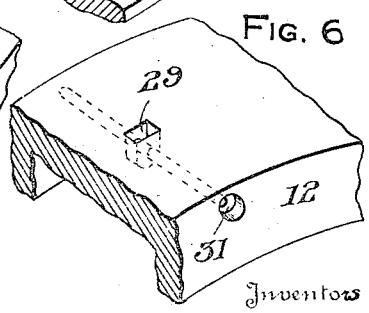
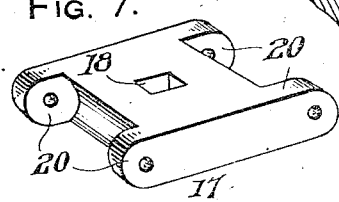
Inventors
B. Biss
L. Kohn
By A. M. Wilson
Attorney

UNITED STATES PATENT OFFICE.

BENNI BISS AND LEOPOLD KOHN, OF NEW YORK, N. Y.

RESILIENT WHEEL.

1,245,150. Specification of Letters Patent. Patented Nov. 6, 1917.

Application filed April 23, 1917. Serial No. 163,984.

*To all whom it may concern:*

Be it known that we, BENNI BISS, a subject of the King of Hungary, and LEOPOLD KOHN, a citizen of the United States, residing at New York, in the county of New York and State of New York, have invented certain new and useful Improvements in Resilient Wheels, of which the following is a specification.

This invention relates to certain new and useful improvements in resilient wheels.

The primary object of the invention is the provision of a resilient wheel especially adapted for use with trucks and heavy vehicles, the structure possessing great strength and durability although capable of yieldingly supporting the load.

A further object of the device is to provide a strong wheel in which the ground engaging member possesses no resiliency but is provided with a spring mounting means arranged in a compact serviceable structure.

With these general objects in view and others that will appear as the nature of the invention is better understood, the same consists in the novel construction, combination and arrangement of parts hereinafter fully described, illustrated in the accompanying drawing and pointed out in the appended claims.

In the drawing forming a part of this application and in which like numerals refer to corresponding parts throughout the several views, Figure 1 is a side elevation of the preferred embodiment of the invention, one-half of the same being illustrated and with parts broken away.

Fig. 2 is an enlarged radial sectional view taken upon line II—II of Fig. 1.

Fig. 3 is a similar view taken upon line III—III of Fig. 1.

Fig. 4 is an inner perspective view of a portion of the tread plate.

Fig. 5 is an interior perspective view of a portion of the outer rim.

Fig. 6 is a perspective view of a different portion of the outer rim, and,

Fig. 7 is a perspective view of one of the attaching blocks employed with the device.

The present wheel may be formed of any desirable diameter and broadly consists of a central wheel member 10 having a channeled rim, hereinafter called the inner rim mounted thereon while an outer channeled rim 12 is resiliently connected to the inner rim by the plurality of leaf springs 13 arranged within the adjacent channeled sides of the rims.

The outer rim 12 has its channel 14 upon its inner side and arranged with inwardly projecting posts 15 provided with perforations, attaching blocks 17 being arranged within the channel 14 and provided with central rectangular openings 18 for removably receiving the posts 16. Pins or keys 19 are preferably arranged through the perforations 16 of the posts for retaining the blocks 17 in position.

The adjacent blocks 17 are connected together by the leaf springs 13 which are pivotally connected between projecting end lugs 20 of the blocks by means of pintles 21 while the central portion of the springs 13 are seated within the channel 22 of the inner rim 11 being rigidly secured thereto by means of bolts 23 passing through the springs 13, the inner rim 11 and the felly 24 of the inner wheel 10.

The inner rim 11 is preferably formed in two sections for seating the same upon the periphery of the felly 24, the same being secured to the felly by means of bolts 25 passing through opposite depending lugs 26 of the inner rim 11 to the portion of the felly 24 positioned therebetween. An annular tread plate 27, preferably formed in two parts is adapted for removably positioning outwardly of the outer rim 12, the said tread plate having inwardly projecting ears 28 for reception within sockets 29 of the outer rim 12 and removably secured therein by elongated screws 30 arranged within transverse bores 31 of the outer rim 12 having traversing sockets 29 and passing through the perforations 32 of the ears 28.

The operation of the device will be apparent from this detail description thereof, it being seen that by the use of an ordinary wheel 10, the inner rim 11 may be mounted thereon while the outer rim 12 is then resiliently positioned upon the inner rim by means of the connecting springs 13 and the attaching blocks 17. The tread plate 27 may have its outer face of any form desired, the same being illustrated herein as presenting a smooth and slightly curved surface. A resilient wheel is arranged which possesses great strength, being capable of resiliently supporting heavy loads by reason of the strong formation of the springs 13.

What we claim as new is:—

1. A spring wheel comprising an outer rim having an inwardly opening channel, posts carried by said rim within the channel thereof, attaching blocks removably carried by said posts, inwardly curved springs pivotally connected between the said blocks and a mounting member for the wheel arranged inwardly of and in contact with the said springs.

2. A spring wheel comprising an outer rim having an inwardly opening channel, posts carried by said rim within the channel thereof, attaching blocks removably carried by said posts, inwardly curved springs pivotally connected between the said blocks, a wheel member positioned inwardly of said springs, an inner rim carried by said wheel member with said springs seated thereon and removable connections between the said springs and inner rim.

In testimony whereof we affix our signatures.

BENNI BISS.
LEOPOLD KOHN.